(12) United States Patent
Martin et al.

(10) Patent No.: US 12,661,609 B2

(45) Date of Patent: Jun. 23, 2026

---

(54) SELF-CLEANING AIR FILTER ASSEMBLY

(71) Applicant: PHINIA Jersey Holdings LLC, Wilmington, DE (US)

(72) Inventors: Thomas Rodrigues Martin, Auburn Hills, MI (US); Richard Hoag, Caledonia, NY (US); Maria Rocio Lemaster, Auburn HIlls, MI (US)

(73) Assignee: PHINIA Jersey Holdings LLC, Wilmington, DE (US)

( * ) Notice: Subject to any disclaimer, the term of this patent is extended or adjusted under 35 U.S.C. 154(b) by 301 days.

(21) Appl. No.: 18/377,172

(22) Filed: Oct. 5, 2023

(65) Prior Publication Data

US 2024/0115986 A1 Apr. 11, 2024

Related U.S. Application Data

(60) Provisional application No. 63/413,350, filed on Oct. 5, 2022.

(51) Int. Cl.
| | |
|---|---|
| *B01D 46/69* | (2022.01) |
| *B01D 46/52* | (2006.01) |
| *F02M 25/08* | (2006.01) |

(52) U.S. Cl.
CPC ........... *B01D 46/69* (2022.01); *B01D 46/521* (2013.01); *F02M 25/0854* (2013.01); *B01D 2265/028* (2013.01); *B01D 2279/35* (2013.01)

(58) Field of Classification Search
CPC ........ B01D 46/52; B01D 46/10; B01D 46/00; B01D 46/69; B01D 46/521; F02M 25/08; F02B 77/00
See application file for complete search history.

(56) References Cited

U.S. PATENT DOCUMENTS

| | | | | |
|---|---|---|---|---|
| 5,638,786 | A * | 6/1997 | Gimby | F02M 25/0872 |
| | | | | 55/296 |
| 6,390,073 | B1 * | 5/2002 | Meiller | F02M 25/0854 |
| | | | | 123/519 |
| 8,657,927 | B2 * | 2/2014 | Rockwell | F02M 25/089 |
| | | | | 55/444 |

* cited by examiner

*Primary Examiner* — Sharon Pregler
(74) *Attorney, Agent, or Firm* — WARNER NORCROSS + JUDD LLP

(57) ABSTRACT

A self-cleaning air filter assembly is provided and includes a filter housing having an upper portion and a lower portion that together define an internal volume. An air filter element is disposed in the internal volume. The upper portion of the filter housing includes a canister port adapted for fluid connection with an evaporative emissions canister. The lower portion of the filter housing includes a first port adapted for fluid connection with an atmospheric vent, and a second port adapted for fluid connection with a source of low pressure air. During a cleaning mode, air is pulled from the first port and along the filter element to the second port in order to remove particulate matter from the filter element. A vehicle evaporative emissions control system including the air filter assembly and a method of cleaning an air filter assembly are also provided.

8 Claims, 5 Drawing Sheets

SELF-CLEANING AIR FILTER ASSEMBLY

CROSS-REFERENCE TO RELATED APPLICATIONS

This application claims the benefit of U.S. Provisional Application No. 63/413,350, filed Oct. 5, 2022, the disclosure of which is incorporated by reference in its entirety.

FIELD OF THE INVENTION

The disclosure generally relates to evaporative emissions control systems and, more specifically, to air filter assemblies for evaporative emissions control systems.

BACKGROUND OF THE INVENTION

Evaporative loss of fuel vapor generated within fuel tanks of the fuel systems of motor vehicles powered by internal combustion engines is a potential contributor to atmospheric air pollution by hydrocarbons. Canister systems that employ adsorbents such as activated carbon to adsorb the fuel vapor emitted from the fuel systems are used to limit such evaporative emissions from the fuel tanks of gasoline-fueled automotive vehicles. A typical evaporative emissions canister includes a casing inside of which a gas passage is formed and filled with activated carbon as a fuel vapor adsorbent. Charge and purge ports for fuel vapor are communicated with one end of the gas passage, while an atmospheric port (vent port) is communicated with the other end of the gas passage, thus allowing for charging of the canister. During stoppage of the vehicle (e.g., when parked), fuel vapor generated from the fuel introduced during refueling and stored in the fuel tank is passed through the charge port into the canister and adsorbed by the adsorbent. During operation of the engine, atmospheric air is introduced through the atmospheric vent port to purge the fuel vapor in the canister by desorbing fuel vapor that was adsorbed in the adsorbent. The flow of air carries the purged fuel vapor to an intake system of the engine through the purge port so that the fuel vapor can be combusted within the engine, thus accomplishing a purging of the canister. By the desorption of fuel vapor during purging, the carbon adsorbent is regenerated and a fuel vapor adsorbing performance of the canister is revived, thereby allowing the adsorbent to repeatedly adsorb fuel vapor during periods of non-use of the engine.

The atmospheric vent port of the canister is typically connected to an air filter to allow for the removal of dirt, dust, debris, and other particulate matter from the vent air prior to its introduction into the canister. In some arrangements, the air filter is located in a filter housing having one port connected to the canister and another port connected to the vent. During purging, air is sucked through the vent-side port to the canister-side port, trapping the particulate matter in the filter before it can pass to the canister. However, the purging operation may only constitute approximately 10% of the vehicle engine run time, and outside of the purging operation, there is little to no air flow within the filter housing. Over time, the filter will become dirty and covered with particulate matter, which eventually may decrease the flowrate through the filter and the performance of the canister.

BRIEF SUMMARY

An improved, self-cleaning air filter assembly for a vehicle evaporative emissions control system is provided.

The air filter assembly includes a filter housing having an upper portion and a lower portion. The upper and lower portions together define an internal volume. An air filter element is disposed in the internal volume of the filter housing. The filter element includes a first side facing the upper portion of the filter housing and an opposite second side facing the lower portion of the filter housing. The upper portion of the filter housing includes a canister port adapted for fluid connection with an evaporative emissions canister. The lower portion of the filter housing includes a first port adapted for fluid connection with an atmospheric vent. The lower portion of the filter housing further includes a second port adapted for fluid connection with a source of low pressure air. During a cleaning mode in which there is nominal airflow through the filter element from one side of the filter element to the other side, air is pulled from the first port and along the second side of the filter element to the second port in order to remove particulate matter from the filter element. The particulate matter is expelled out the second port.

In specific embodiments, the first port is disposed at one end of the lower portion of the filter housing, and the second port is disposed at an opposite end of the lower portion of the filter housing.

In specific embodiments, the first and second ports are both formed in a bottom surface of the lower portion of the filter housing.

In specific embodiments, the filter element is adjacent a division between the upper and lower portions of the filter housing.

In specific embodiments, the filter element is disposed in the lower portion of the filter housing.

In specific embodiments, the second side of the filter element facing the lower portion of the filter housing is a pleated side of the filter element.

In specific embodiments, the upper and lower portions of the filter housing are connected by one of a hinge or clip.

An evaporative emissions control system for a vehicle is also disclosed. The evaporative emissions control system includes the air filter assembly as described above. The system further includes an evaporative emissions canister having a charge port, a purge port, and a vent port. The vent port of the evaporative emissions canister is connected to and in fluid communication with the canister port of the air filter assembly. The first port in the lower portion of the filter housing is connected to and in fluid communication with an atmospheric vent. The second port in the lower portion of the filter housing is connected to and in fluid communication with a source of low pressure air.

In specific embodiments, the source of low pressure air is at a pressure that is less than atmospheric pressure.

In specific embodiments, the source of low pressure air is a slipstream of the vehicle.

A method of cleaning an air filter assembly of a vehicle evaporative emissions control system is also provided. The method includes providing the air filter assembly as described above. The method further includes fluidly connecting the first port in the lower portion of the filter housing to an atmospheric vent. The method further includes fluidly connecting the second port in the lower portion of the filter housing to a source of low pressure air. The source of low pressure air pulls air from the first port into the filter housing and along the second side of the filter element to the second port in order to remove particulate matter from the filter element, and the particulate matter is expelled out the second port.

In specific embodiments, the source of low pressure air is at a pressure that is less than atmospheric pressure.

In specific embodiments, the source of low pressure air is a slipstream of a vehicle.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A self-cleaning air filter assembly for an evaporative emissions control system is provided. Referring to FIGS. 1-5, wherein like numerals indicate corresponding parts throughout the several views, the evaporative emissions control system is illustrated and generally designated at 10. Certain features of the evaporative emissions control system 10 are functional, but can be implemented in different aesthetic configurations.

Figure 1:
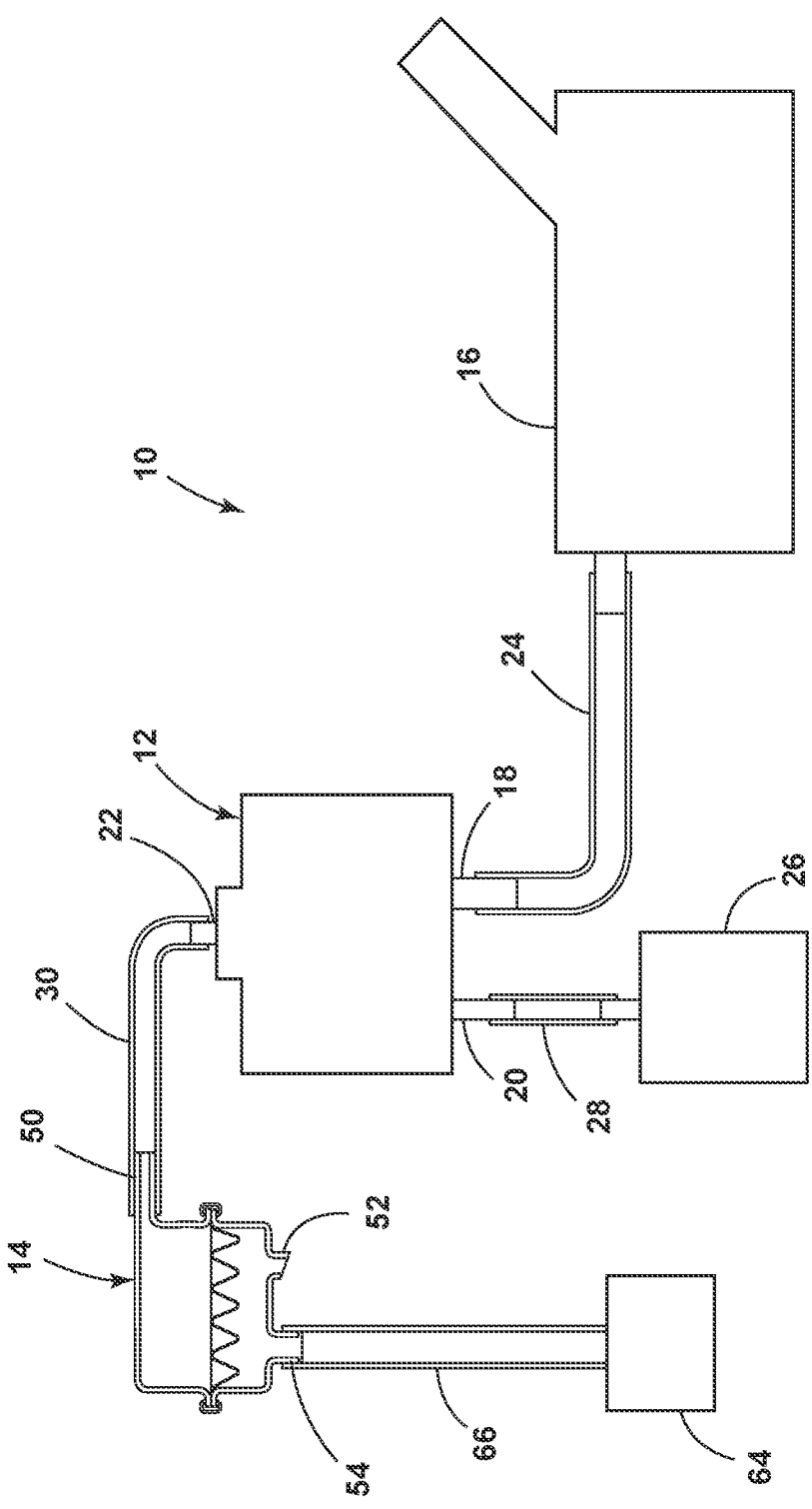
FIG. 1 is a schematic view of an evaporative emissions control system in accordance with some embodiments of the disclosure.

Turning first the FIG. 1, the evaporative emissions control system 10 generally includes an evaporative emissions canister 12 and the self-cleaning air filter assembly 14. The evaporative emissions canister 12 is illustrated as a fuel vapor storage canister for a fuel tank of a vehicle fuel system that pumps liquid fuel, by way of non-limiting example gasoline fuel, from the fuel tank 16 to an internal combustion engine (not shown) that powers an automotive vehicle. The fuel vapor storage canister 12 traps fuel vapors that arise in the fuel tank during periods of non-use of the internal combustion engine due to, for example, daily variations in ambient temperatures and during refilling of the fuel tank. The canister 12 has at least one inlet and outlet in fluid communication with an internal volume of the canister. Particularly, the canister 12 has a charge port 18, a purge port 20, and a vent port 22. The charge port 18 and purge port 20 are disposed at one end of the internal volume of the canister 12, while the vent port 22 is disposed at an opposite end of a flow path through the internal volume, so that there may be fluid flow between the charge port 18 and the vent port 22 or between the vent port 22 and the purge port 20. The charge port 18 is connected to and in fluid communication with the vehicle fuel tank 16 via a conduit 24 or similar. The purge port 20 is connected to and in fluid communication with a purge source 26 (e.g. an air intake system) of the engine (not shown) via a conduit 28 or similar. The vent port 22 is in fluid communication with the atmosphere for venting the canister 12 and for admission of purge air into the canister. More specifically, the vent port 22 is connected to the air filter assembly 14 via a conduit 30 or similar which in turn is connected to an atmospheric vent. As described in greater detail below, the air filter assembly 14 filters ambient purge air that is then inhaled into the canister 12 during a purge operation. During non-use of the internal combustion engine when the engine is off (non-operational), fuel vapors generated in the fuel tank 16 travel through the charge port 18 and into the internal volume of the canister 12. The fuel vapors become trapped in the canister 12, and the remaining air exits the canister through the vent port 22. During certain periods of operation of the internal combustion engine when the engine is running, air is drawn into the canister 12 through the vent port 22, and the trapped fuel vapors are expelled from the canister 12 through the purge port 20 and into the air intake system of the internal combustion engine. It is therefore apparent that the charge port 18 is an inlet of the canister 12 and the purge port 20 is an outlet of the canister, while the vent port 22 may be an inlet or an outlet depending on the operational mode of the canister 12 (e.g., charging or purging) and the associated direction of flow.

Figure 2:
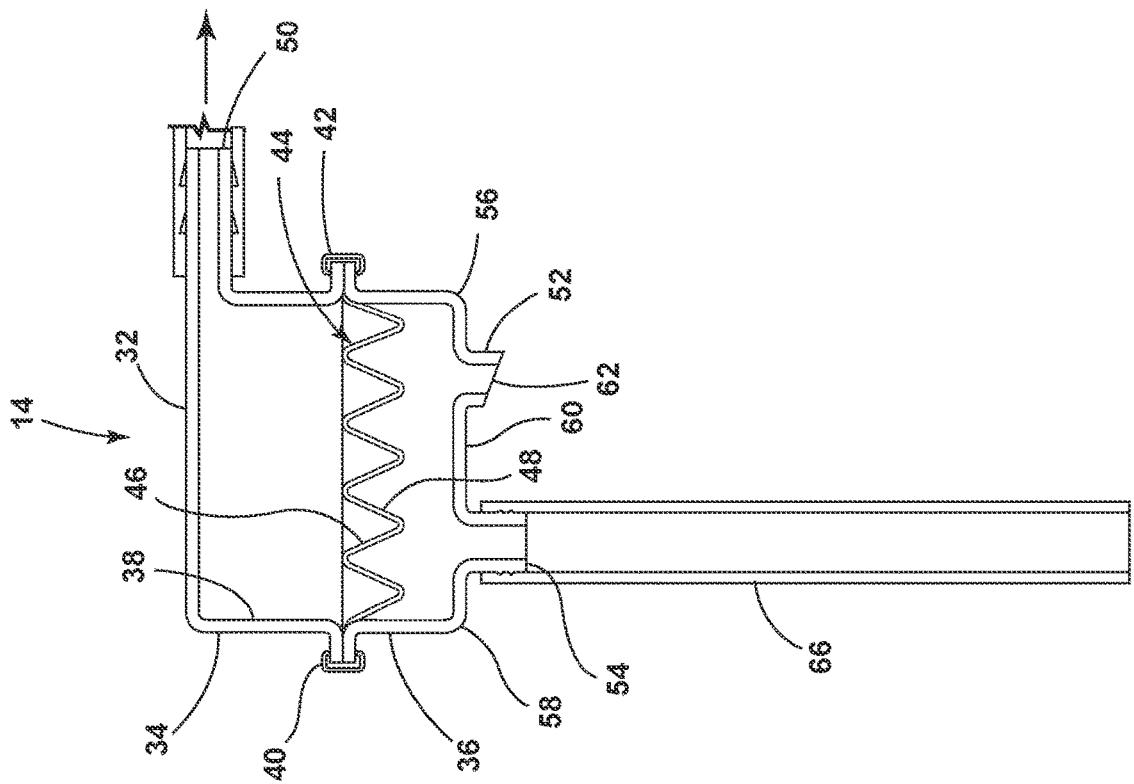
FIG. 2 is an enlarged view of a self-cleaning air filter assembly of the evaporative emissions control system of FIG. 1.

With reference to FIGS. 1 and 2, the air filter assembly 14 includes a filter housing 32. The filter housing 32 has an upper portion 34 and a lower portion 36 that together define an internal volume 38 of the filter housing. The upper portion 34 of the filter housing is connected to the lower portion 36 by one or more of a hinge 40 and a clip or clips 42. The filter housing 32 may be openable and closeable by separating the upper portion 34 from the lower portion 36, such as by releasing the one or more clips 42 and/or pivoting the upper portion relative to the lower portion about the hinge 40. An air filter element 44 is disposed in the internal volume 38 of the filter housing 32. The filter element 44 has a first side 46 that faces the upper portion 34 of the filter housing 32 and an opposite second side 48 that faces the lower portion 36 of the filter housing. The filter element 44 is generally centrally disposed in the filter housing 32 adjacent a division between the upper and lower portions 34, 36, and the filter element may extend into the lower portion rather than the upper portion. In any event, the filter element 44 extends across the internal volume 38 of the filter housing 32 and partitions the internal volume between the upper and lower portions 34, 36. The filter element 44 may be a corrugated, pleated sheet of material and may be included in a filter media cartridge that can be removed and replaced in the filter assembly 14.

The upper portion 34 of the filter housing 32 includes a canister port 50 that is connected to (fluidly connected) and in fluid communication with the vent port 22 of the canister 12. Charge air exiting the canister 12 via the vent port 22 enters into the air filter assembly 14 via the canister port 50, and purge air exits the air filter assembly through the same canister port 50. Advantageously, the lower portion 36 of the filter housing 32 includes at least two ports 52, 54. The first of these ports 52 is disposed at one end 56 of the lower portion 36 of the filter housing 32, while the second of these ports 54 is disposed at an opposite end 58 of the filter housing, such that the two ports 52, 54 are at opposite extremities of the filter housing. Both of the first and second ports 52, 54 may be formed in a bottom surface 60 of the lower portion 36 of the filter housing 32 as shown, or alternatively the two ports may be located in the sidewalls of the lower portion of the housing. Essentially, the first and second ports 52, 54 are located nearly as far apart from each other in the filter housing 32 and at opposite ends of the filter housing to allow air travelling between the two ports to traverse as much of the cross-sectional area of the internal volume 38 of the filter housing as possible, the significance of which will become more apparent from the discussion below. The first port 52 is connected to (fluidly connected) and in fluid communication with an atmospheric vent (fresh air inlet/outlet) 62, and the second port 54 is connected to (fluidly connected) and in fluid communication with a source of low pressure air 64 via, for example, a conduit 66. The atmospheric vent 62 may be a passive ambient air inlet that allows fresh air to enter into the assembly 14 during a purge operation as shown schematically in FIG. 3, or that allows air from the canister 12 to be vented during a charge operation as shown schematically in FIG. 4. The source of low pressure air 64 is at a pressure that is preferably less than atmospheric pressure and at least at a pressure that is lower than the pressure of air at the atmospheric vent 62. More preferably, there is a negative ΔP between the second port 54 and the first port 52 that is significant enough to allow for air flow from the first port to the second port as described in more detail below. The source of low pressure air 64 may be, for example, a slipstream of the vehicle in which the evaporative emissions control system 10 is located, wherein the distal (open) end of the conduit 66 connected to the second port 54 is placed at a location on the vehicle where the slipstream of the moving vehicle passes. For purposes of explanation, the slipstream is generally defined as a region in the vicinity of a moving object in which the flow of fluid (e.g. air) is moving at a velocity similar to that of the moving object, relative to the ambient fluid through which the object is moving. Slipstreams caused by turbulent flow have a lower pressure than that of the ambient fluid around the object.

Figure 3:
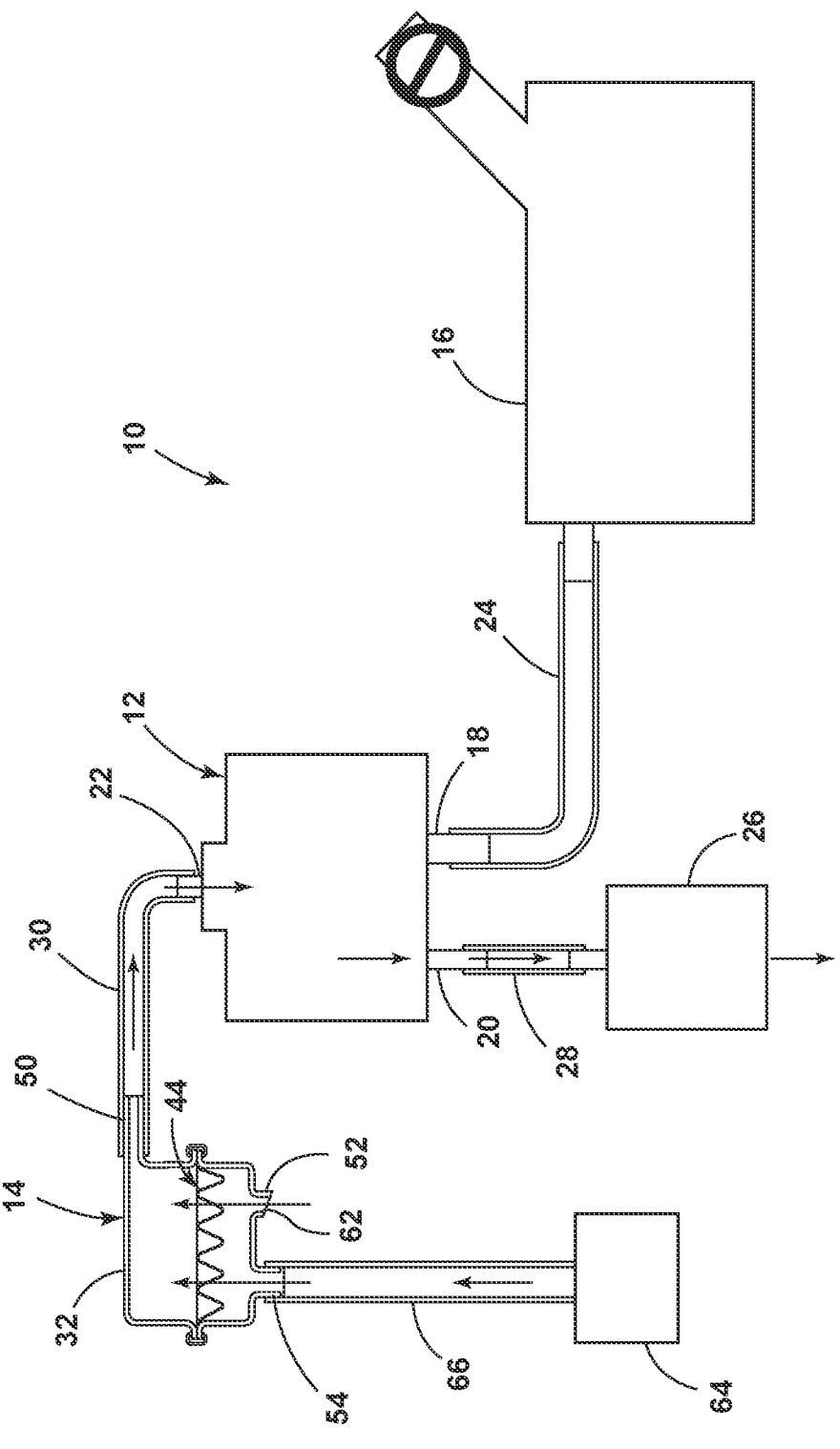
FIG. 3 is a schematic view of the evaporative emissions control system of FIG. 1, illustrating a purging mode of the system during engine/vehicle operation.

During vehicle operation and rest, the evaporative emissions control system 10 switches between charging, purging, and cleaning modes. As shown in FIG. 3 by arrows representing the direction of flow, fuel vapors trapped in the canister 12 are removed from the canister during the purging mode. The purge source 26 provided by the vacuum suction of the air intake system of the vehicle's engine draws air through the atmospheric vent 62 and into the filter housing 32 through the first port 52. The suction of the purge source 26 may also draw air into the filter housing 32 through the second port 54, depending on the pressure difference between the purge source 26 and the source of low pressure air 64 connected to the second port. As fresh air is drawn from the first port 52 (and also the second port 54) through the filter housing 32 during a purge operation, the filter element 44 traps dust, dirt, and other particulate matter in the pleats of the filter element, allowing only clean air to pass from the from the second side 48 of the filter to the first side 46. Clean air exits the filter housing 32 so that dirt and debris are not passed to the canister 12 but remain trapped in/on the filter element 44. The clean air moves out of the filter housing 32 through the canister port 50, into the conduit 30, and through the vent port 22 of the canister 12. As the clean air passes through the internal volume of the canister 12 from the vent port 22 to the purge port 20, fuel vapors trapped in the canister 12 are reabsorbed by the purge air and taken out of the canister via the purge port 20. The mixture of purge air and fuel vapors that leaves the canister 12 is sent via the purge source 26 to the vehicle's engine where it is combusted. The purge source 26 may draw air through the evaporative emissions control system 10 at flow rates up to approximately 60 SLPM. The purging mode may be toggled on and off by opening and closing of a valve (not shown) between the purge source 26 and the canister 12. For example, the purging mode may be active, via the valve or other similar control, around 10% of the engine run time of the vehicle.

Figure 4:
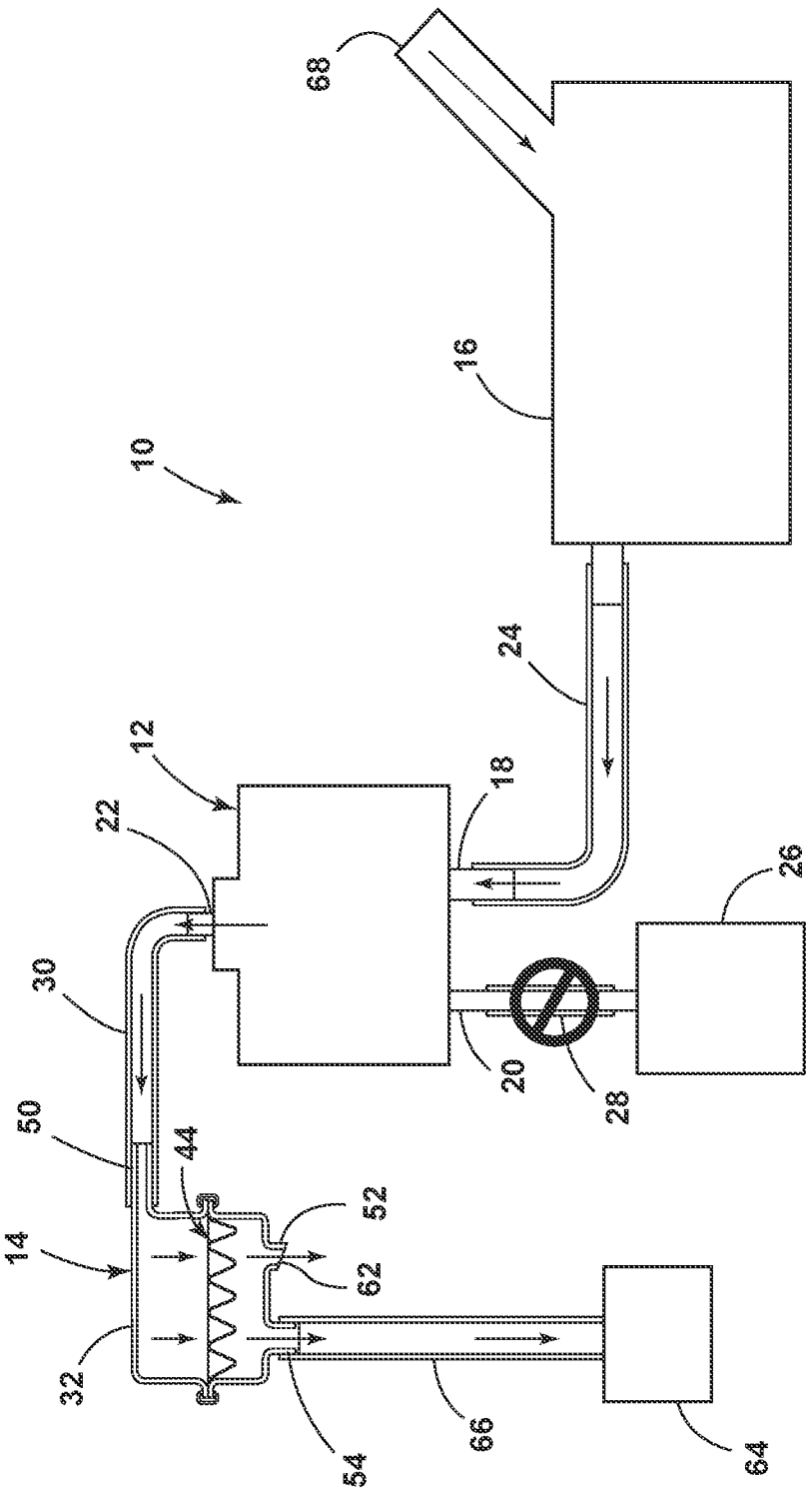
FIG. 4 is a schematic view of the evaporative emissions control system of FIG. 1, illustrating a charging mode of the system during refueling.

The charging mode of the evaporative emissions control system 10 occurs when the vehicle's engine is not running, and, for example, the vehicle is being refueled. Since the vehicle's engine is off, the purge source 26 is not operational. As shown in FIG. 4 by arrows representing the direction of flow, fuel dispensed from a gas pump through a fuel nozzle into the vehicle's fuel tank 16 via an inlet 68 pushes vapors present in the fuel tank out of the tank, through conduit (tank line) 24, and into the canister 12 at flow rates up to around 60 SLPM for approximately three to five minutes or as long as it takes to fill the vehicle's fuel tank. As the fuel vapors pass through the canister 12, they become trapped by the adsorbent in the canister. Essentially only pure air exits the canister 12 through the vent port 22 and passes through the conduit 30 and into the filter housing 32 via the canister port 50. The up to 60 SLPM of air outflow from the canister 12 through the filter housing 32 dislodges some particulate material that is trapped in the filter element 44. The dislodged material is dispelled from the air filter assembly 14 through one or both of the first and second ports 52, 54.

Figure 5:
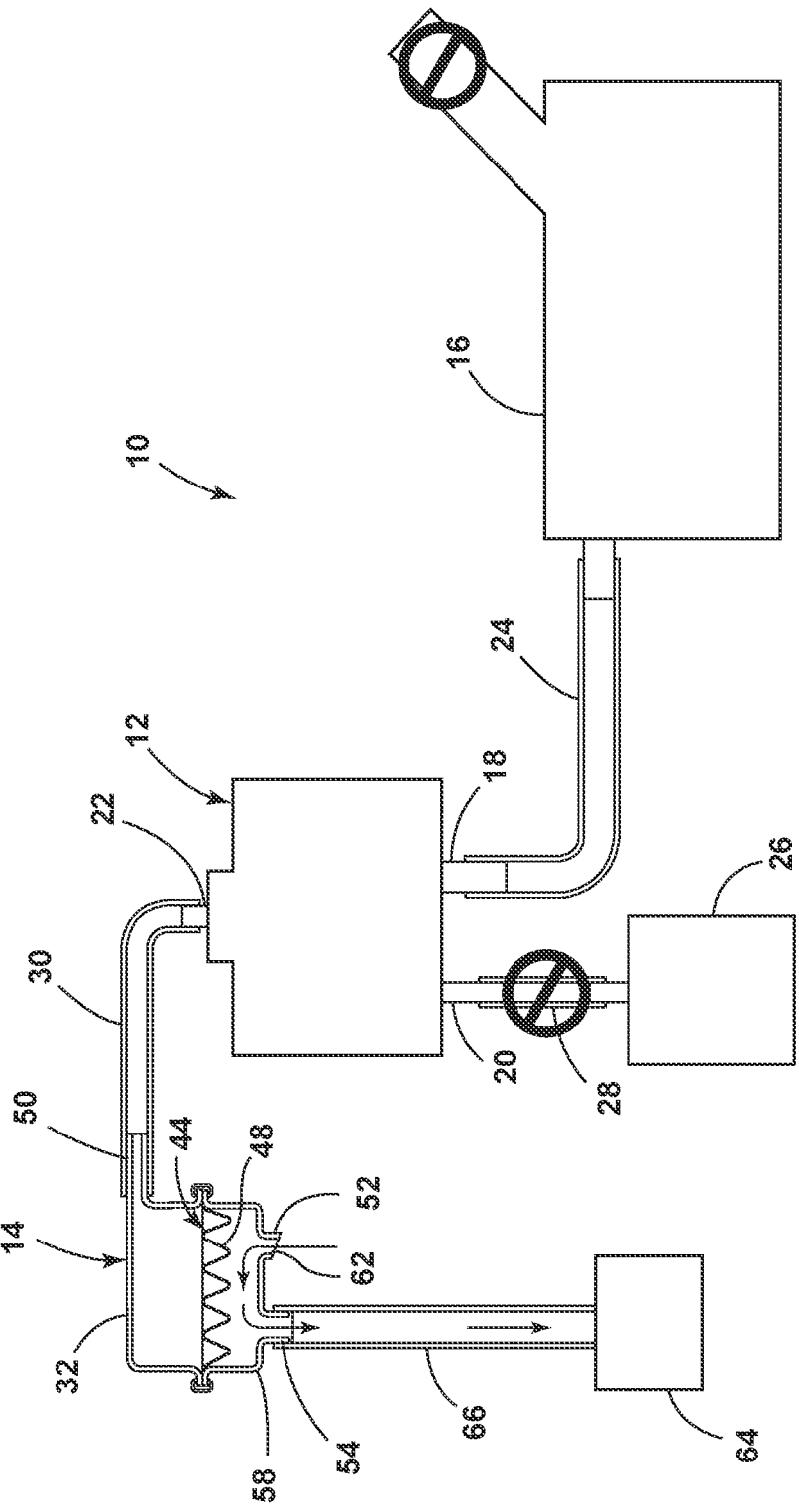
FIG. 5 is a schematic view of the evaporative emissions control system of FIG. 1, illustrating a cleaning mode of the system during engine/vehicle operation.

The cleaning mode constitutes approximately 90% of the vehicle engine's run-time. As shown in FIG. 5 by an arrow representing the direction of flow, during the cleaning mode the canister 12 is isolated from the purge source 26 by closing the valve or other fluid flow control between the purge source and the canister. The fuel tank cap is also in place (the vehicle is not being refueled). Thus, there is essentially no movement of air or fuel vapors through the canister 12 and likewise no airflow through the filter element 44 in the filter housing 32. However, due to the motion of the vehicle and the fluid connection of the second port 54 to the slipstream of the vehicle (or other source of low pressure air), the pressure differential between the second port 54 and the first port 52 causes air to be drawn into the filter housing 32 through the first port 52, along the second side 48 of the filter element 44, and to the second port 54 on the opposite end 58 of the filter housing. The flow of air along the filter element 44 removes particulate matter trapped on the filter element and expels the particulate matter out of the second port 54, thereby passively (no additional input of energy required) cleaning the filter element using the natural flow of air and source of low pressure provided by the movement of the vehicle. The air filter assembly 14 thusly utilizes a readily and freely available, passive source of low pressure air to clean the filter element 44 of the air filter assembly.

In some cases, if the slipstream of the vehicle cannot provide an adequate pressure differential between the first and second ports of the filter housing, a small Venturi nozzle may be incorporated at the second port or in the conduit between the second port and the slipstream of the vehicle. In yet another alternative, an air pump may be connected to the second port to provide an active source of low pressure air. In any event, the disposition of the two ports 52, 54 in the filter housing 32 of the air filter assembly 14 allows for the flow of cleaning air from the first port 52 to the second port 54 to pass along nearly the entirety of the filter element 44 to naturally provide for the cleaning of dirt, dust, and other particulate matter away from the filter element.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A self-cleaning air filter assembly for a vehicle evaporative emissions control system, the air filter assembly comprising:

a filter housing having an upper portion and a lower portion, the upper and lower portions together define an internal volume;

an air filter element disposed in the internal volume of the filter housing, the filter element including a first side facing the upper portion of the filter housing and an opposite second side facing the lower portion of the filter housing;

the upper portion of the filter housing including a canister port adapted for fluid connection with an evaporative emissions canister;

the lower portion of the filter housing including a first port adapted for fluid connection with an atmospheric vent; and the lower portion of the filter housing further including a second port adapted for fluid connection with a source of low pressure air;

wherein during a cleaning mode in which there is nominal airflow through the filter element from one side of the filter element to the other side, air is pulled from the first port and along the second side of the filter element to the second port in order to remove particulate matter from the filter element, the particulate matter being expelled out the second port.

2. The air filter assembly of claim 1, wherein the first port is disposed at one end of the lower portion of the filter housing, and the second port is disposed at an opposite end of the lower portion of the filter housing.

3. The air filter assembly of claim 1, wherein the first and second ports are both formed in a bottom surface of the lower portion of the filter housing.

4. The air filter assembly of claim 1, wherein the filter element is adjacent to a division between the upper and lower portions of the filter housing.

5. The air filter assembly of claim 1, wherein the filter element is disposed in the lower portion of the filter housing.

6. The air filter assembly of claim 1, wherein the second side of the filter element facing the lower portion of the filter housing is a pleated side of the filter element.

7. The air filter assembly of claim 1, wherein the upper and lower portions of the filter housing are connected by one of a hinge or clip.

8. The method of claim 1, wherein the low pressure air is at a pressure that is lower than a pressure of air at the atmospheric vent.

* * * * *